United States Patent [19]

Wootton

[11] 4,190,733
[45] Feb. 26, 1980

[54] HIGH-VOLTAGE ELECTRICAL APPARATUS UTILIZING AN INSULATING GAS OF SULFUR HEXAFLUORIDE AND HELIUM

[75] Inventor: Roy E. Wootton, Murrysville, Pa.

[73] Assignee: Westinghouse Electric Corp., Pittsburgh, Pa.

[21] Appl. No.: 808,571

[22] Filed: Jun. 21, 1977

[51] Int. Cl.² .............................................. H01B 3/56
[52] U.S. Cl. .................................. 174/28; 174/14 R; 174/16 B; 252/63.5
[58] Field of Search .............. 252/63.5, 66; 174/14 R, 174/17 GF, 25 G, 26 G, 28, 16 B; 200/148 G

[56] References Cited

U.S. PATENT DOCUMENTS

| | | | |
|---|---|---|---|
| 2,038,507 | 4/1936 | Edsall | 174/17 GF X |
| 2,221,670 | 11/1940 | Cooper | 174/17 GF |
| 2,757,261 | 7/1956 | Lingal et al. | 200/148 G |
| 2,867,679 | 1/1959 | Cobine | 200/148 G X |
| 3,792,188 | 2/1974 | Cronin | 174/14 R X |
| 3,864,507 | 2/1975 | Fox et al. | 174/14 R X |

OTHER PUBLICATIONS

Cookson et al., "Movement of Filamentary Conducting Particles under AC Voltages in High Pressure Gases", Int'l Symposium on High Voltage Technology, Zurich 1975, pp. 416-420.

Ryan et al., "Factors Affecting the Insulation Strength of SF₆ Filled Systems", C.I.G.R.E paper 15-02, 1976 session.

Primary Examiner—Harris A. Pitlick
Attorney, Agent, or Firm—M. S. Yatsko

[57] ABSTRACT

High-voltage electrical apparatus includes an outer housing at low potential, an inner electrode disposed within the outer housing at high potential with respect thereto, and support means for insulatably supporting the inner electrode within the outer housing. Conducting particles contaminate the interior of the outer housing, and an insulating gas electrically insulates the inner electrode from the outer housing even in the presence of the conducting particles. The insulating gas is comprised of sulfur hexafluoride at a partial pressure of from about 2.9 to about 3.4 atmospheres absolute, and helium at a partial pressure from about 1.1 to about 11.4 atmospheres absolute. The sulfur hexafluoride comprises between 20 and 65 volume percent of the insulating gas.

6 Claims, 7 Drawing Figures

HIGH-VOLTAGE ELECTRICAL APPARATUS UTILIZING AN INSULATING GAS OF SULFUR HEXAFLUORIDE AND HELIUM

BACKGROUND OF THE INVENTION

The Government has rights in this invention pursuant to Contract No. E(49-18)2125 awarded by the United States Energy Research and Development Administration.

This invention relates generally to high-voltage electrical apparatus, and more particularly to an insulating gas for use in such electrical apparatus.

High-voltage gas-insulated electrical apparatus typically is comprised of an outer housing at low or ground potential, an inner electrode at high potential with respect to the grounded outer housing which is disposed within the outer housing, and support insulators for insulatably supporting the inner electrode within the outer housing. An insulating gas is generally utilized to electrically insulate the inner electrode from the outer housing, with the result that the high dielectric strength of the insulating gas enables closer, more compact spacings between the inner electrode and the outer housing. Sulfur hexafluoride has been utilized as the insulating gas for many reasons associated with its useful combination of vapor pressure, chemical stability, cost, electric strength, thermal conductivity, and non-toxicity, among other properties.

One problem which has arisen in the design of these high-voltage gas insulated systems is the mobile conducting or semiconducting particle. These particles can traverse between the inner electrode and the outer housing to thereby cause sparking, corona, or can lead to flashovers and breakdown of the insulating gas. These contaminating particles can lower the breakdown strength of the sulfur hexafluoride gas, resulting in a possible need for an increased size of the gas-insulated apparatus, or a possible necessity of including within the apparatus means for eliminating or deactivating the conducting particles.

SUMMARY OF THE INVENTION

In accordance with this invention, high-voltage electrical apparatus comprises an outer housing at low potential, an inner electrode at high potential disposed within the outer housing, and support means for insulatably supporting the inner electrode within the outer housing. Contaminating particles are present within the interior of the outer housing, and an insulating gas is disposed within the outer housing and electrically insulates the inner electrode from the outer housing even in the presence of these contaminating particles. The insulating gas is comprised of sulfur hexafluoride at a partial pressure within the range 2.9 to 3.4 atmospheres absolute, and helium at a partial pressure within the range 1.1 to 11.4 atmospheres absolute. The sulfur hexafluoride comprises from about 20 to about 65 volume percent of the gas mixture, with the helium comprising from about 35 to about 80 volume percent of the insulating gas.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
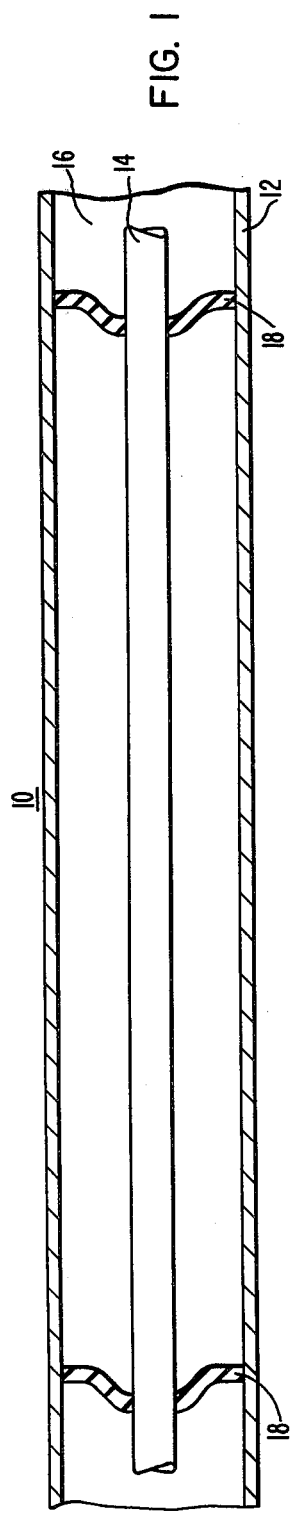
FIG. 1 is a sectional view of a typical gas insulated transmission line which may utilize the teachings of this invention.
Figure 2:
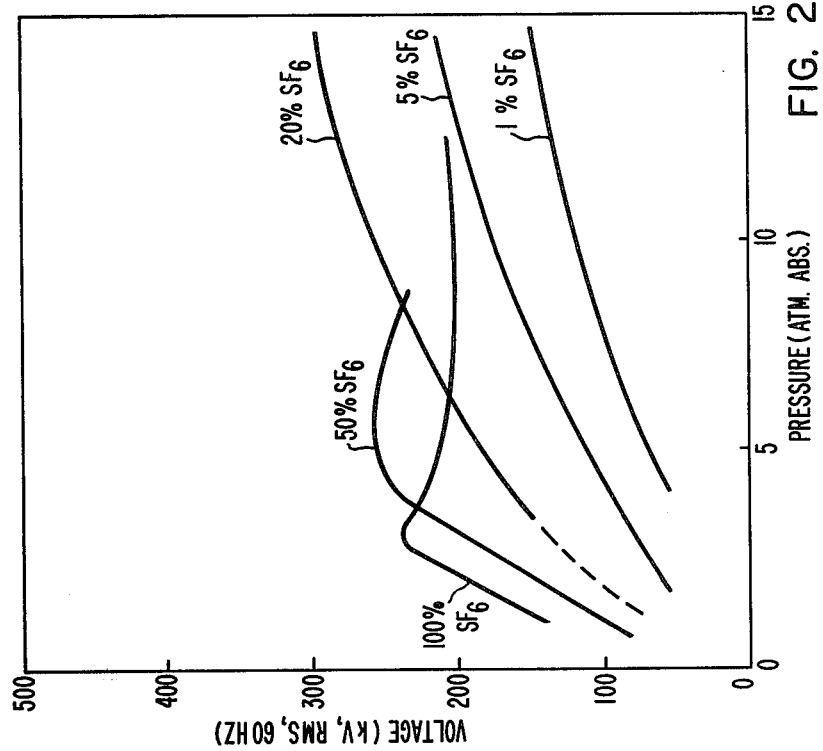
FIGS. 2, and 3 are graphs showing the breakdown voltage of helium-sulfur hexafluoride mixtures in a 3 inch plane parallel gap in the presence of aluminum contamination particles.
Figure 3:
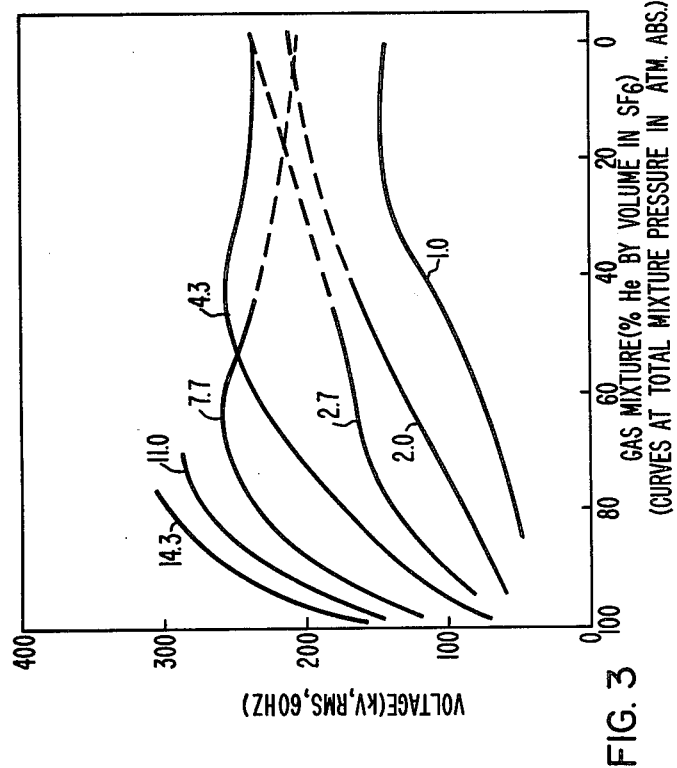
Figure 4:
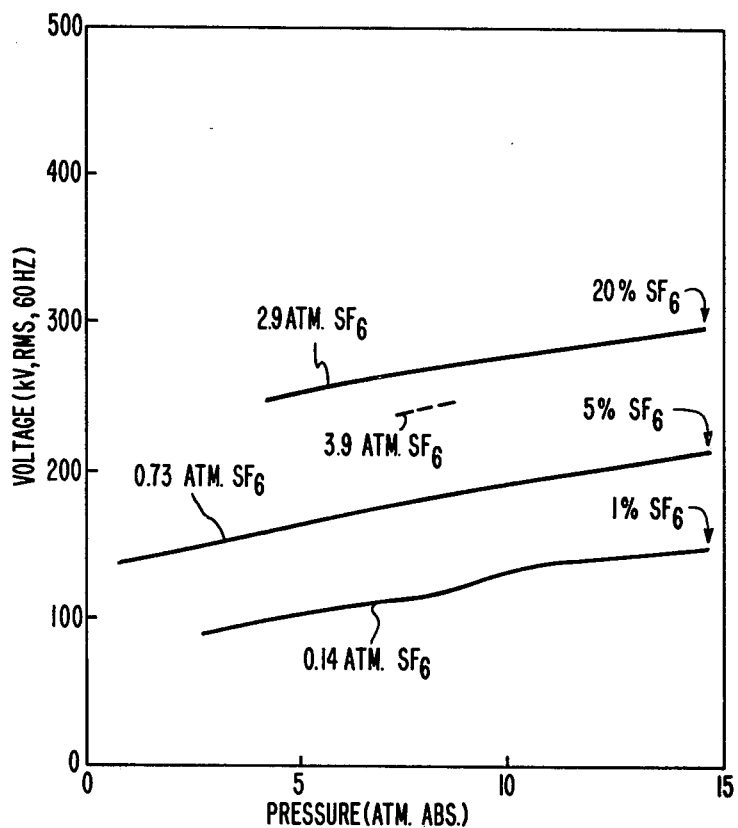
FIG. 4 is a graph showing the dependence of the breakdown voltage on pressure for helium-sulfur hexafluoride gas mixtures with constant partial pressures of sulfur hexafluoride in a 3 inch parallel plane gap in the presence of aluminum contamination particles.
Figure 5:
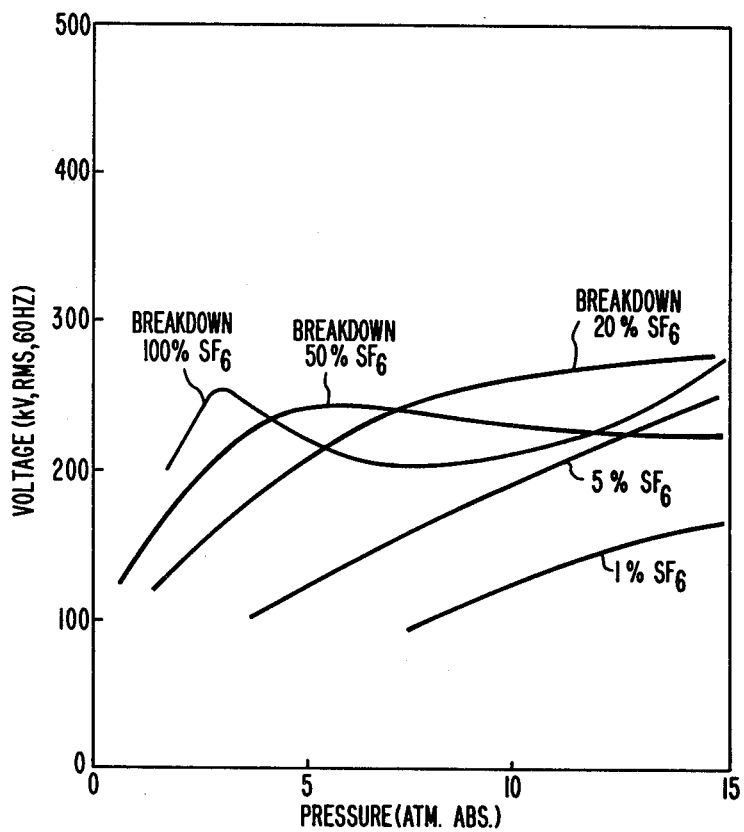
FIGS. 5 and 6 are graphs showing the breakdown of helium-sulfur hexafluoride mixtures in a 3 inch plane parallel gap in the presence of copper contamination particles.
Figure 6:
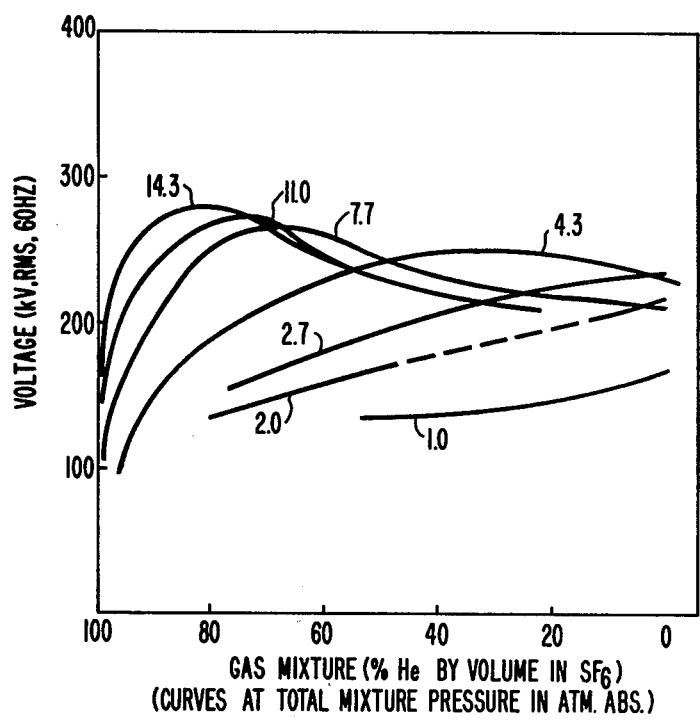
Figure 7:
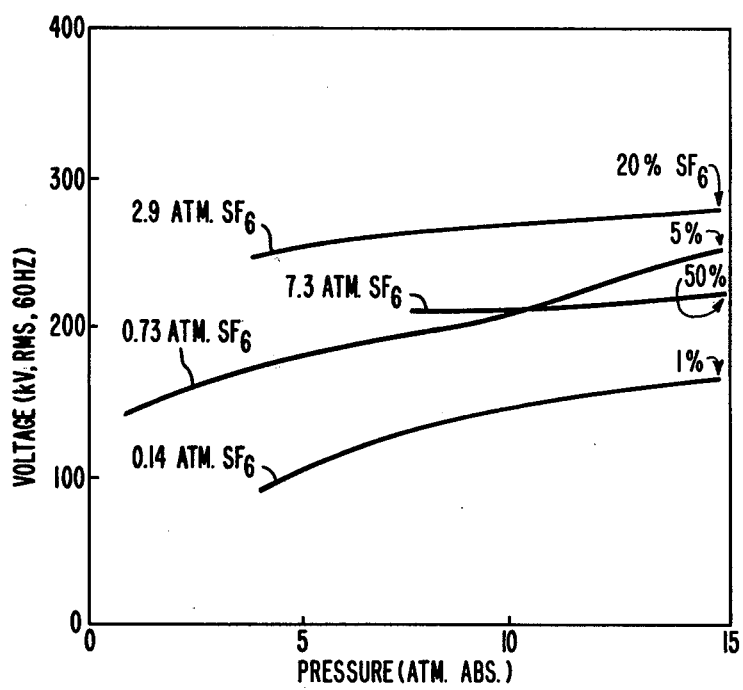
FIG. 7 is a graph showing the dependence of breakdown voltage on pressure for helium-sulfur hexafluoride gas mixtures with constant partial pressures of sulfur hexafluoride in a 3 inch plane parallel gap in the presence of copper contamination particles.

Referring now more particularly to FIG. 1, therein is illustrated a typical high-voltage, compressed gas insulated transmission line 10 utilizing the teachings of this invention. Although this description is made with reference to the transmission line 10 illustrated in FIG. 1, it is to be understood that the invention is likewise applicable to other high-voltage, gas-insulated electrical apparatus such as circuit breakers, disconnect switches, and the like, wherever an insulating gas is utilized to insulate a high potential electrical conductor from a low potential outer housing and where the presence of conducting contamination particles may lower the breakdown strength of the dielectric insulating gas. The transmission line 10 is comprised of a generally cylindrical, elongated outer housing 12, and an elongated, typically tubular inner electrode 14 disposed within, and spaced apart from, the outer housing 12. The outer housing 12 and the inner conductor 14, for a transmission line, would typically be of a good, electrically-conducting material such as aluminum. The outer housing 12 would generally be at low or ground potential, and the inner electrode 14 would be at a high electrical potential with respect to the outer housing 12, at voltages typical of which would be 138 kV to 1,200 kV. A plurality of support insulators 18 are disposed within the outer housing 12, and function to insulatably support the inner electrode 14 within the outer housing 12. An insulating gas 16 is also disposed within the outer housing 12, and functions to electrically insulate the inner electrode 14 from the outer housing 12.

The insulating gas 16 which was utilized in the prior art was generally substantially pure sulfur hexafluoride at pressures of about 50 lbs./sq.in. gauge. The sulfur hexafluoride gas would, theoretically, have a very high breakdown voltage level. However, this theoretical strength failed to be achieved in actuality due to the presence within the outer housing 12 of mobile conducting or semiconducting contamination particles. These contamination particles would enter the outer housing 12 during, for example, installation in the field or during manufacture of the transmission line 10, or might even be disposed therein because of sliding motion of the inner electrode 14 due to thermal expansion. Another means of generating these undesirable particles, in a circuit breaker or disconnect switch, would be upon movement of the inner electrodes against each other to make or break the electrical circuits, with the result being that the electrodes would rub against each other and tiny particles would thereby be generated. These particles, as heretofore described, would lower the dielectric strength of the sulfur hexafluoride beneath that which would theoretically be possible.

Mixtures of sulfur hexafluoride and helium gases were found to exhibit a degree of immunity from the effects of this conducting particle contamination. Tests were undertake utilizing gas mixtures of sulfur hexafluoride and helium at various concentrations and mixture pressures, and graphs of these tests are illustrated in FIGS. 2–7. The tests were made using ¼ inch long by 0.018 inch diameter copper and aluminum wires in a 3 inch plane parallel gap. The breakdown strength for the various concentrations and pressures of sulfur hexafluoride and helium are plotted in FIGS. 2–7, and it was found that there are partial pressures of sulfur hexafluoride in sulfur hexafluoride-helium mixtures such that the addition of additional helium improves the electrical 60 Hz strength of the mixture. At any fixed total mixture pressure, the highest strength is obtained with a partial pressure of sulfur hexafluoride of 2.9 to 3.4 atmospheres absolute, and with this partial pressure of sulfur hexafluoride, the breakdown strength of the mixture increases with the addition of helium. This is contrary to the teachings of the prior art, where in the absence of conducting particle contamination and in a uniform or moderately uniform field, the substitution of helium for an equal volume of sulfur hexafluoride will result in a decrease in the breakdown strength.

The following Table is a compact tabulation of the various curves illustrated in FIGS. 2–7 which illustrates the highest breakdown voltage obtainable for various concentrations and partial pressures of sulfur hexafluoride and according to the total gas mixture pressure.

TABLE

| Total Mixture Pressure (Atm. Abs.) | % $SF_6$ for Highest Breakdown Voltage | Partial Pressure of $SF_6$ | | Breakdown Voltage (kV,rms,60Hz) |
|---|---|---|---|---|
| | | (psi) | (Atm.$^6$ Abs.) | |
| 14.3 | 20 | 43 | 2.9 | 280 |
| 11.0 | 30 | 50 | 3.4 | 275 |
| 7.7 | 40 | 46 | 3.1 | 260 |
| 4.3 | 65 | 44 | 3.0 | 250 |
| 2.9 | 100 | 42 | 2.9 | 245 |

As can be seen from this table, the partial pressure of sulfur hexafluoride, within the range of 2.9 to 3.4 atmospheres absolute yields the highest breakdown voltage of the insulating gas from total mixture pressures of 2.9 to 14.3 atmospheres absolute. The percentage of sulfur hexafluoride for the highest breakdown voltage varies from 20 to 100%, with the remainder of the gas mixture being helium. Thus, the helium would be at a partial pressure within the range 1.3 to 11.4 atmospheres absolute, and would comprise from about 35 to 80 volume percent of the gas mixture. As can be seen, as the total mixture pressure increases, the lesser percentage of sulfur hexafluoride is required and still yields a higher breakdown voltage. Again, this higher breakdown voltage occurs only in the presence of conducting or semiconducting particle contamination, and in the absence of such contamination, a 100% sulfur hexafluoride insulating gas would yield the highest breakdown voltage.

Thus, it can be seen that the insulating gas mixture of this invention provides an insulating gas which exhibits a degree of immunity from the effects of conducting particle contamination.

I claim as my invention:

1. High-voltage electrical apparatus comprising:
   an outer housing at low potential having conducting particles contaminating the interior thereof;
   an inner electrode at high potential disposed within said outer housing;
   support means for insulatably supporting said inner electrode within said outer housing; and
   an insulating gas disposed within said outer housing and electrically insulating said inner electrode from said outer housing, said insulating gas being at a pressure within the range from about 4.3 to about 14.3 atmospheres absolute, said insulating gas comprising:
   sulfur hexafluoride at a partial pressure within the range 2.9 to 3.4 atmospheres absolute; and
   helium at a partial pressure within the range from about 1.1 to 11.4 atmospheres absolute.

2. The electrical apparatus according to claim 1 wherein said insulating gas pressure is 14.3 atmospheres absolute and said partial pressure of sulfur hexafluoride is 2.9 atmospheres absolute.

3. The electrical apparatus according to claim 1 wherein said insulating gas pressure is 11.0 atmospheres absolute and said partial pressure of sulfur hexafluoride is 3.4 atmospheres absolute.

4. The electrical apparatus according to claim 1 wherein said insulating gas pressure is 7.7 atmospheres absolute and said partial pressure of sulfur hexafluoride is 3.1 atmospheres absolute.

5. The electrical apparatus according to claim 1 wherein said insulating gas pressure is 4.3 atmospheres absolute and said partial pressure of sulfur hexafluoride is 3.0 atmospheres absolute.

6. The apparatus according to claim 1 wherein said electrical apparatus is a gas-insulated transmission line.

* * * * *